(12) United States Patent
Lee et al.

(10) Patent No.: US 7,687,567 B2
(45) Date of Patent: Mar. 30, 2010

(54) GLASS FIBER REINFORCED POLYCARBONATE RESIN COMPOSITION HAVING EXCELLENT IMPACT STRENGTH AND FLOWABILITY AND METHOD FOR PREPARING THE SAME

(75) Inventors: Bong Jae Lee, Seoul (KR); Tae Uk Kim, Suwon-si (KR); Young Jun Lee, Yongin-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/190,031

(22) Filed: Aug. 12, 2008

(65) Prior Publication Data

US 2009/0048389 A1     Feb. 19, 2009

(30) Foreign Application Priority Data

Aug. 17, 2007  (KR) ................. 10-2007-0082712
Jul. 7, 2008    (KR) ................. 10-2008-0065273

(51) Int. Cl.
   *C09B 67/00*     (2006.01)
   *C08F 290/04*    (2006.01)

(52) U.S. Cl. ..................... 524/502; 524/504

(58) Field of Classification Search ............ 524/502
    See application file for complete search history.

(56) References Cited

U.S. PATENT DOCUMENTS 5,847,041 A * 12/1998 Takemura et al. .......... 524/504

2007/0179237 A1 * 8/2007 Sekine ..................... 524/492

FOREIGN PATENT DOCUMENTS

| JP | 05-125260 A | 5/1993 |
| JP | 05125260 A * | 5/1993 |
| JP | 08-027366 A | 1/1996 |
| JP | 08-027368 A | 1/1996 |
| KR | 10-2004-0088662 A | 10/2004 |

OTHER PUBLICATIONS

Wang, K. et al., Composites Science and Technology, 61, 1529-1538, 2001.*
Translation of JP05125260, May 1993.*
International Search Report and Written Opinion in corresponding International Application No. PCT/KR2007/007013, mailed on May 16, 2008.
Korean Office Action in counterpart Korean Application No. 10-2008-0065273, dated Nov. 30, 2009.

* cited by examiner

*Primary Examiner*—Ling-Siu Choi
*Assistant Examiner*—Hui Chin
(74) *Attorney, Agent, or Firm*—Summa, Additon & Ashe, P.A.

(57) ABSTRACT

The present invention provides a glass fiber reinforced polycarbonate resin composition having good flowability and excellent impact resistance. The resin composition comprises (A) 100 parts by weight of a glass fiber reinforced polycarbonate resin; and (B) about 0.1 to about 10 parts by weight of a polyolefin modified with at least one functional group selected from the group consisting of methacrylate groups, acrylate groups, modified ester groups, C6-C12 arylate groups, acrylonitrile groups, and combinations thereof.

20 Claims, No Drawings

GLASS FIBER REINFORCED POLYCARBONATE RESIN COMPOSITION HAVING EXCELLENT IMPACT STRENGTH AND FLOWABILITY AND METHOD FOR PREPARING THE SAME

CROSS-REFERENCE TO RELATED APPLICATIONS

This non-provisional application claims priority under 35 USC Section 119 from Korean Patent Application No. 2007-82712, filed Aug. 17, 2007, and Korean Patent Application No. 2008-65273, filed Jul. 7, 2008, the entire disclosure of each of which is hereby incorporated by reference.

FIELD OF THE INVENTION

The present invention relates to a glass fiber reinforced polycarbonate resin composition.

BACKGROUND OF THE INVENTION

Glass fiber reinforced thermoplastic resin has been used in electronic articles and automobile parts which require rigidity, due to its high flexural strength. In general, a glass fiber reinforced polycarbonate resin exhibits improved tensile strength and flexural strength, while maintaining good moldability. In particular, glass fiber reinforced polycarbonate resin has good flexural modulus and thermal resistance, and it is therefore useful for articles which need to endure continuous heat or load.

However, reinforcing a thermoplastic resin with glass fiber can lower its impact resistance as compared to the same thermoplastic resin without glass fiber, and thus it cannot be employed in parts which are susceptible to fragmentation when subjected to exterior impact. Glass fiber reinforced resin also exhibits low flowability upon molding. Consequently, there can production disadvantages associated with using the same because of the need to increase temperatures for injection molding and the like. Furthermore, when a core-shell graft copolymer is used as an impact modifier in glass fiber reinforced polycarbonate resin to reinforce the impact resistance thereof, such a polycarbonate resin exhibits low flowability, which leads to considerable fragmentation of glass fiber during extrusion. As a result, glass reinforced polycarbonate resin may not enhance impact resistance as desired.

SUMMARY OF THE INVENTION

The present invention is directed to glass fiber reinforced polycarbonate resin compositions and methods for preparing and using the same. The glass fiber reinforced polycarbonate can have a good balance of properties, such as excellent impact resistance and high flowability, as well as good flexural modulus, light resistance, and chemical resistance. The glass fiber reinforced polycarbonate resin compositions of the invention are accordingly suitable for the manufacture of various molded articles, including articles requiring high impact resistance, such as housings for electrical and electronic appliances and automotive precision parts.

In exemplary embodiments of the invention, the resin composition comprises (A) 100 parts by weight of a glass fiber reinforced polycarbonate resin; and (B) about 0.1 to about 10 parts by weight of a polyolefin modified with at least one functional group selected from the group consisting of methacrylate groups, acrylate groups, modified ester groups, C6-C12 arylate groups, acrylonitrile groups, and combinations thereof.

In exemplary embodiments of the invention, the glass fiber reinforced polycarbonate resin (A) can include about 40 to about 95% by weight of a polycarbonate resin and about 5 to about 60% by weight of glass fiber.

In exemplary embodiments of the invention, the modified polyolefin (B) is a branched graft copolymer having a polyolefin main chain and a functional group side chain.

In exemplary embodiments of the invention, the side chain is present in an amount of from about 5 to about 50% by weight based on the total weight of the modified polyolefin (B). Further, the main chain of the branched graft copolymer can comprise at least about 70% by weight of polyethylene, polypropylene, or ethylene-propylene copolymer.

In exemplary embodiments of the invention, the glass fiber may be surface-treated.

In exemplary embodiments of the invention, the resin composition can have a melt flow rate (MFR) measured in accordance with ASTM-D1238 of about 12 to about 25 g/10 minutes (250° C., 10 kg) and a notch Izod impact strength measured for ⅛" specimens in accordance with ASTM-D256 of about 19 to about 50 kgf·cm/cm. The resin composition can further have a brittle fracture rate of about 0 to about 10% when a specimen of the composition is subject to a chemical treatment and the brittle fracture rate of the chemically treated specimen is measured by dropping a 1 kg sphere onto the specimens at a height of 50 cm 20 times, wherein the chemical treatment comprises submerging the specimen into a paint thinner for 2 minutes and thereafter drying the specimen at 80° C. for 30 minutes; and a difference in yellow index of about 0.7 measured prior to and after UV irradiation for 3 hours using a calorimeter (Minolta 3600D by CIE Lab.) in accordance with ASTM G53.

In exemplary embodiments of the invention, the resin composition may further comprise additives such as UV absorbing agents, inorganic fillers, flame retardants, lubricants, plasticizers, thermal stabilizers, antioxidants, light stabilizers, pigments, dyes, and the like, and combinations thereof.

Another aspect of the invention provides a molded article produced from the resin composition. Since the resin compositions of the present invention have excellent impact resistance, flowability, rigidity, chemical resistance, and light resistance, the compositions are well suited for the production of housings for electrical and electronic appliances and precision parts for automobiles.

In another aspect of the invention, the invention provides a method for preparing a glass fiber reinforced polycarbonate resin composition. The method comprises providing about 40 to about 95 parts by weight of a polycarbonate resin and about 0.1 to about 10 parts by weight of a branched graft copolymer having a polyolefin main chain into a main feeder of an extruder; adding about 5 to about 60 parts by weight of a glass fiber through a side feeder of the extruder; and operating the extruder at a temperature of about 230 to about 350° C.

In exemplary embodiments of the invention, the branched graft copolymer having a polyolefin main chain may be a polyolefin modified with at least one functional group selected from the group consisting of methacrylate groups, acrylate groups, modified ester groups, C6-C12 arylate groups, acrylonitrile groups, and combinations thereof.

In another aspect, the invention provides a method for improving the properties of glass fiber reinforced polycarbonate resin compositions, such as flowability, impact resistance, chemical resistance and light resistance. The method comprises employing about 0.1 to about 10 parts by weight of a polyolefin modified with at least one functional group selected from the group consisting of methacrylate groups, acrylate groups, modified ester groups, C6-C12 arylate groups, acrylonitrile groups, and combinations thereof, per 100 parts by weight of a glass fiber reinforced polycarbonate resin. In exemplary embodiments, the composition excludes a core-shell graft copolymer and/or acrylonitrile-butadiene-styrene graft copolymer resin.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Glass Fiber Reinforced Polycarbonate Resin

The glass fiber reinforced polycarbonate resin of the present invention has a polycarbonate resin as matrix and is reinforced with a glass fiber.

The polycarbonate resin of the present invention can be prepared by any suitable conventional methods as are well known to those skilled in the art.

In exemplary embodiments of the invention, the polycarbonate resin may be prepared by reacting a dihydric phenol with phosgene in the presence of a catalyst and a molecular weight controlling agent, or can be prepared by transesterification of a carbonate precursor such as dihydric phenol and diphenylcarbonate.

In exemplary embodiments, the dihydric phenol can be a bisphenol, such as but not limited to 2,2-bis(4-hydroxyphenyl)propane (bisphenol A). The bisphenol A may be partially or totally substituted with other dihydric phenols. Other non-limiting examples of dihydric phenols suitable for use in the present invention may include hydroquinone, 4,4'-dihydroxydiphenyl, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfon, bis(4-hydroxyphenyl)sulfoxide, bis(4-hydroxyphenyl)ketone, bis(4-hydroxyphenyl)ether, and the like, and also may include halogenated bisphenols such as 2,2-bis(3,5-dibromo-4-hydroxyphenyl)propane, and the like, as well as combinations thereof.

The polycarbonate resin used in the present invention may be a homopolymer or a copolymer of two or more types of dihydric phenols, or mixtures thereof.

Other non-limiting examples of polycarbonate resins suitable for use in the present invention may also include linear polycarbonates, branched polycarbonates, polyester carbonate copolymers, silicon copolymer polycarbonates, and the like, and combinations thereof.

An example of an exemplary linear polycarbonate resin is bisphenol A-based polycarbonate resin.

The branched polycarbonate can be prepared by reacting polyfunctional aromatic compounds such as trimelitic anhydride, trimelitic acid and the like, with dihydroxyphenol and a carbonate precursor.

The polyester carbonate copolymer may also be prepared by reacting difunctional carboxylic acid with dihydric phenol and a carbonate precursor.

The weight average molecular weight (Mw) of the polycarbonate resin can range from about 10,000 to about 200,000, for example, from about 15,000 to about 80,000.

Glass fiber suitable for use in the present invention can be selected from commercially available glass fibers or can be produced by methods well known in the art.

The present invention is not limited to a particular type, shape or cross section configuration of the glass fiber. Exemplary glass fibers useful in the invention include glass fiber with a round cross sectional shape. The present invention, however, is not limited to round fibers, and the shape of the fiber can vary depending on the particular end uses of the composition.

In exemplary embodiments of the present invention, the glass fiber can include round-shaped glass fiber with a length of about 3 to about 6 mm and a diameter of about 10 to about 20 μm.

In the present invention, the glass fiber can be treated with a surface-treating agent in order to prevent the glass fiber from reacting with the matrix resin and to improve the degree of impregnation. Coupling agents can be used as the surface-treating agent and suitable glass fiber surface treating methods can be readily carried out by those skilled in the art. In exemplary embodiments, the coupling agent can be a silane coupling agent.

In exemplary embodiments of the invention, the glass fiber reinforced polycarbonate resin comprises about 40 to about 95% by weight of a polycarbonate resin and about 5 to about 60% by weight of a glass fiber. Within these ranges, it is possible to sufficiently disperse the glass fiber in the polycarbonate resin. These ranges can further impart excellent mechanical properties, flexural strength and thermal resistance to the resin. In other exemplary embodiments, the glass fiber reinforced polycarbonate resin can include about 50 to about 90% by weight of a polycarbonate resin and about 10 to about 50% by weight of a glass fiber, for example, about 60 to about 80% by weight of a polycarbonate resin and about 20 to about 40% by weight of a glass fiber.

(B) Modified Polyolefin

In general, the glass fiber reinforced polycarbonate resin (A) has low flowability and impact strength as compared to the same polycarbonate resin but without glass fiber. However, the inventors have found that it is possible to obtain good chemical resistance and light resistance, as well as improved flowability and impact strength, by employing a specific amount of a modified polyolefin (B) with the glass fiber reinforced polycarbonate resin (A).

The modified polyolefin is a branched graft copolymer and comprises a polyolefin in the backbone with functional groups grafted thereto.

In exemplary embodiments, the modified polyolefin may be prepared by copolymerizing an olefin and at least one compound selected from the group consisting of methacrylates, acrylates, modified esters including an ethylenically unsaturated group, C6-C12 arylates including an ethylenically unsaturated group, acrylonitrile groups, and combinations thereof.

In exemplary embodiments of the present invention, the modified polyolefin may be modified with at least one functional group selected from the group consisting of methacrylate groups, acrylate groups, modified ester groups, C6-C12 arylate groups, acrylonitrile groups, and combinations thereof.

The main chain of the modified polyolefin can comprise about 70% by weight or more of polyethylene, polypropylene, ethylene-propylene copolymer, or a combination thereof. As non-limiting examples, the main chain of the modified polyolefin can include about 75% by weight or more, as another example about 80% by weight or more, and as yet another example about 85% by weight or more, of a polyolefin selected from polyethylene, polypropylene, ethylene-propylene copolymer, or a combination thereof.

The functional groups in the side chain can be partially compatible with polycarbonate. The functional groups may include a methacrylate group such as methylmethacrylate, ethylmethacrylate, butylmethacrylate, and the like; an acrylate group such as methylacrylate, ethylacrylate, butylacrylate, and the like; a modified ester group such as ethylene glycol; an C6-C12 arylate group, an acrylonitrile group; and the like, as well as combinations thereof.

The side chain is present in an amount of from about 5 to about 50% by weight based on the total weight of the modified polyolefin (B). This range of side chains can provide sufficient compatibility with the polycarbonate so as to prevent substantial exfoliation and also provide excellent impact resistance. The side chain can be present in an amount of, for example, from about 5 to about 40% by weight, and as another example from about 7 to about 30% by weight.

In exemplary embodiments, the modified polyolefin (B) can have a repeating unit as shown in Chemical Formula 1.

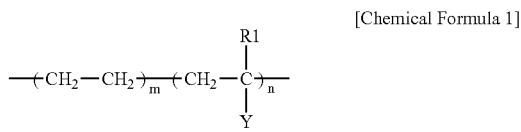

[Chemical Formula 1]

wherein $R_1$ is hydrogen or methyl; Y is —$COOR_2$ (wherein $R_2$ is $C_1$-$C_{12}$ alkyl), glycidyl modified ester group, C6-C12 arylate group or —CN; m and n are the degree of polymerization, and m:n is about 300:1 to about 10:90.

The modified polyolefin (B) may be a random copolymer, a block copolymer, a multiblock copolymer or a mixture thereof.

The modified polyolefin (B) as shown in Chemical Formula 1 may have a melt index (MI) of about 0.01 to about 40 g/10 minutes (190° C., 2.16 kg), for example about 0.1 to about 10 g/10 minutes (190° C., 2.16 kg).

The modified polyolefin (B) of the present invention is used in an amount of about 0.1 to about 10 parts by weight, for example about 1 to about 7 parts by weight, and as another example about 1.5 to about 6 parts by weight, per about 100 parts by weight of the glass fiber reinforced polycarbonate resin (A). This range of the modified polyolefin can provide a good balance of properties such as flexural strength, impact resistance, chemical resistance and light resistance.

The resin composition of the present invention may have a melt flow rate (MFR) of about 12 to about 25 g/10 minutes (250° C., 10 kg) measured in accordance with ASTM-D1238; a notch Izod impact strength of about 19 to about 50 kgf·cm/cm measured for 1/8" specimens in accordance with ASTM-D256; a brittle fracture rate of about 0 to about 10% when a specimen of the composition is subject to a chemical treatment and the brittle fracture rate of the chemically treated specimen is measured by dropping a 1 kg sphere onto the specimens at a height of 50 cm 20 times, wherein the chemical treatment comprises submerging the specimen into a paint thinner for 2 minutes and thereafter drying the specimen at 80° C. for 30 minutes; and a difference in yellow index of about 0.7 measured prior to and after UV irradiation for 3 hours using a calorimeter (Minolta 3600D by CIE Lab.) in accordance with ASTM G53.

The glass fiber reinforced polycarbonate resin composition of the invention may further comprise conventional additives, which can be selected based on the particular end use of the composition. The additives may include UV absorbing agents, inorganic fillers, flame retardants, lubricants, plasticizers, thermal stabilizers, antioxidants, light stabilizers, pigments, dyes, and the like, and can be used alone or in combination with one another.

Exemplary inorganic fillers useful in the present invention may include without limitation carbon fiber, talc, silica, mica, alumina and the like, and combinations thereof. Inorganic fillers may improve physical properties such as mechanical strength and thermal deformation temperature.

In addition, the polycarbonate resin composition may further comprise about 0.1 to about 10 parts by weight, for example about 0.5 to about 8 parts by weight, of a phenyl substituted siloxane copolymer having a dynamic viscosity of about 1 to about 300 mm²/s at 25° C., based on 100 parts by weight of polycarbonate resin. The phenyl substituted siloxane copolymer may include poly(methylphenyl)siloxane, poly(diphenyl)siloxane, dimethylsiloxane-diphenylsiloxane copolymer, dimethylsiloxane-methylphenylsiloxane copolymer or a mixture thereof. Use of the phenyl substituted siloxane copolymer may further improve impact strength and processability.

Another aspect of the invention provides a method for improving flowability, impact resistance, chemical resistance and light resistance of the glass fiber reinforced polycarbonate resin composition. The method comprises employing about 0.1 to about 10 parts by weight, for example about 0.5 to about 8 parts by weight, of a polyolefin modified with at least one functional group selected from the group consisting of methacrylate groups, acrylate groups, modified ester groups, C6-C12 arylate groups, acrylonitrile groups, and combinations thereof, per 100 parts by weight of a glass fiber reinforced polycarbonate resin.

As such, when the modified polyolefin is added to the glass fiber reinforced polycarbonate resin, it is possible to obtain a good balance of properties such as flowability, flexural modulus, impact resistance, chemical resistance and light resistance. Core-shell graft copolymers such as methylmethacrylate-butadiene-styrene copolymer and/or acrylonitrile-butadiene-styrene graft copolymer resin (ABS resin) are advantageously excluded from the composition, for the purpose of obtaining the good balance of properties mentioned above.

The resin composition of the present invention may be prepared by a conventional process. For example, the components of the invention and the additives can be mixed in a mixer and the mixture can be melt-extruded through an extruder in the form of pellets. In exemplary embodiments of the invention, the glass fiber reinforced polycarbonate resin composition can be prepared by providing a polycarbonate resin and a branched graft copolymer having a polyolefin main chain into a main feeder and adding a glass fiber through a side feeder to prepare pellets. In exemplary embodiments of the invention, the method comprises providing about 40 to about 95 parts by weight of a polycarbonate resin and about 0.1 to about 10 parts by weight of a branched graft copolymer having a polyolefin main chain into a main feeder of an extruder; adding about 5 to about 60 parts by weight of a glass fiber through a side feeder of the extruder; and operating the extruder at a temperature of about 230 to about 350° C., for example, from about 250 to about 330° C.

Another aspect of the invention provides a molded article produced from the resin composition. Molding methods may include, without limitation, extrusion, injection, vacuum molding, blow molding, casting molding and the like. The molded article has excellent impact resistance, flowability, rigidity, chemical resistance and light resistance, and the articles may be useful as housings for electrical and electronic appliances and precision parts for automobiles.

Since the polycarbonate resin compositions of the present invention have excellent impact resistance, flowability, flexural strength, chemical resistance and light resistance, the compositions can be particularly suitable for exterior parts of electronic goods such as TVs, washing machines, dish washers, computers, audio sets, video players, CD players, mobile phones, telephones, and the like, or vehicle parts such as dashboard panels, door linings, bumpers, battery covers, distributor caps, heater panels and the like.

The invention may be better understood by reference to the following examples which are intended for the purpose of illustration and are not to be construed as in any way limiting the scope of the present invention, which is defined in the claims appended hereto.

EXAMPLES

Components used in the following Examples and Comparative Examples will be described more fully hereinafter:

(A) Glass Fiber Reinforced Polycarbonate Resin (a1) Polycarbonate Resin

Bisphenol-A type linear polycarbonate manufactured by TEIJIN Co. of Japan (PANLITE L-1225WX) with a weight average molecular weight of 22,000 g/mol is used.

(a2) Glass Fiber

Glass fiber (183F) manufactured by Owens Corning Co. having 13 μm filament diameter and 3 mm chopped length is used.

(B) Modified Polyolefin

Elvaloy 1224 AC. which has a copolymer of polyethylene and polypropylene in a main chain and methylacrylate in a side chain, and which includes the side chain in an amount of 24% by weight, manufactured by Dupont Co., is used.

(C) Core-Shell Graft Copolymer

Methylmethacrylate-butadiene-styrene copolymer (product name: C223A) manufactured by MRC Co. of Japan, which is commonly used as an impact modifier for polycarbonate, is used.

Examples 1-4 and Comparative Example 1-5

The components as shown in Table 1 below are mixed and the mixture is extruded through a conventional twin screw extruder (L/D=35, Φ=45 mm) in the form of pellets at 280° C. The polycarbonate resin is added through a Main Feeder and glass fiber through a Side Feeder. The resin pellets are dried at 110° C. for 3 hours or more and are molded into test specimens using a 10 oz injection molding machine at 280 to 320° C. with a barrel temperature 80 to 100° C.

The test specimens are tested for various physical properties as follows and the results are set forth in Table 1 below.

(1) flowability: Melt Flow Rate (MFR) is measured in accordance with ASTM-D1238 at 250° C., before preparing the test specimens. The mass of flowing resin for 10 minutes is measured using a balance weight of 10 kg.

(2) Izod Impact Strength: The notch Izod impact strength is measured for ⅛" specimens (inch, kgf·cm/cm) in accordance with ASTM-D256.

(3) Flexural Modulus: The resin pellets are molded into ¼" thick test specimen using a 10 oz injection molding machine and the flexural modulus is measured in accordance with ASTM-D790 at a speed of 2.8 mm/min, while elongation range is not more than 1%.

(4) Chemical Resistance: The chemical resistance is evaluated by a brittle fracture rate. The test specimen is submerged into a paint thinner (product name: Aekyung Chemical 8100) comprising methylisobutylketone, cyclohexanone and 2-ethoxy ethanol for 2 minutes, and is dried at 80° C. for 30 minutes. Then, the brittle fracture rate of the specimen is measured by dropping a 1 kg sphere onto the specimens at a height of 50 cm 20 times.

(5) Light Resistance: Yellow index is measured prior to and after UV irradiation using a calorimeter (Minolta 3600D by CIE Lab.) The specimens are irradiated for 3 hours using a UV-condensation machine in accordance with ASTM G53 and then a difference in yellow index measured prior to and after UV irradiation is determined.

TABLE 1

| | | Examples | | | | Comparative Examples | | | | |
|---|---|---|---|---|---|---|---|---|---|---|
| | | 1 | 2 | 3 | 4 | 1 | 2 | 3 | 4 | 5 |
| (A) glass fiber reinforced polycarbonate resin | (a1) polycarbonate | 80 | 70 | 70 | 60 | 80 | 70 | 60 | 70 | 70 |
| | (a2) glass fiber | 20 | 30 | 30 | 40 | 20 | 30 | 40 | 30 | 30 |
| (B) modified polyolefin | | 5 | 2 | 5 | 5 | — | — | — | — | 15 |
| (C) core-shell graft copolymer | | — | — | — | — | — | — | — | 5 | — |
| MFR | | 18 | 15 | 16 | 13 | 15 | 13 | 11 | 10 | 17 |
| IZOD ⅛" | | 21 | 20 | 21 | 21 | 13 | 14 | 15 | 12 | 13 |
| Flexural modulus | | 50K | 76K | 75K | 90K | 50K | 76K | 90K | 72K | 65K |
| Chemical resistance | | 0% | 0% | 0% | 0% | 100% | 100% | 100% | 100% | 80% |
| light resistance | | 0.4 | 0.5 | 0.3 | 0.2 | 2.0 | 1.8 | 1.7 | 2.1 | 0.4 |

As shown in Table 1, Examples 1-4 employing the branched graft copolymer having a polyolefin backbone with polycarbonate resin and glass fiber for reinforcing exhibited improved flowability and excellent impact resistance, and they also exhibit a brittle fracture rate of 0% even after chemical treatment. Further, they exhibit a half or less of discoloration in light resistance when compared to the examples that did not include the modified polyolefin.

On the other hand, as shown in Comparative Examples 1-3, it is difficult to improve impact resistance unless the modified polyolefin is added in the composition of polycarbonate and glass fiber. Comparative Examples 1-3 also exhibit a brittle fracture rate of 100% after chemical treatment and very serious yellowing after UV irradiation.

Moreover, when using a core-shell graft copolymer, as shown in Comparative Example 4, the impact resistance of polycarbonate/glass fiber resin did not improve and even flowability is lower. Comparative Example 4 also exhibits a significant decrease in chemical resistance and light resistance. Even when the modified polyolefin is used, if used in an excess amount as in Comparative Example 5, both impact resistance and chemical resistance are decreased again and flexural modulus is also decreased.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A glass fiber reinforced polycarbonate resin composition having good flowability and impact resistance comprising:
   (A) 100 parts by weight of a glass fiber reinforced polycarbonate resin; and
   (B) about 0.1 to about 10 parts by weight of a modified polyolefin having a polyolefin main chain and a side chain comprising at least one functional group selected from the group consisting of methacrylate groups, acrylate groups, modified ester groups, C6-C12 arylate groups, acrylonitrile groups, and combinations thereof, wherein said side chain is present in an amount of about 24 to about 50% by weight based on the total weight of the modified polyolefin (B).

2. The glass fiber reinforced polycarbonate resin composition of claim 1, wherein said glass fiber reinforced polycarbonate resin (A) comprises about 40 to about 95% by weight of a polycarbonate resin and about 5 to about 60% by weight of a glass fiber.

3. The glass fiber reinforced polycarbonate resin composition of claim 1, wherein said modified polyolefin (B) has a repeating unit as shown in Chemical Formula 1:

[Chemical Formula 1]

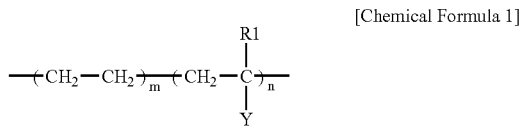

wherein $R_1$ is hydrogen or methyl; Y is —$COOR_2$, (wherein $R_2$ is $C_1$-$C_{12}$ alkyl), glycidyl modified ester, C6-C12 arylate or —CN; m and n are the degree of polymerization and m:n is about 300:1 to about 10:90.

4. The glass fiber reinforced polycarbonate resin composition of claim 1, wherein said main chain of the modified polyolefin comprises at least about 70% by weight of polyethylene, polypropylene, or ethylene-propylene copolymer.

5. The glass fiber reinforced polycarbonate resin composition of claim 2, wherein said glass fiber is surface-treated.

6. The glass fiber reinforced polycarbonate resin composition of claim 1, wherein said resin composition has a melt flow rate (MFR) of about 12 to about 25 g/10 minutes (250° C., 10 kg) measured in accordance with ASTM-D1238; a notch Izod impact strength of about 19 to about 50 kgf·cm/cm measured for a ⅛" specimen in accordance with ASTM-D256; a brittle fracture rate of about 0 to about 10% as determined by subjecting a specimen of the composition to a chemical treatment comprising submerging the specimen into a paint thinner for 2 minutes and thereafter drying the specimen at 80° C. for 30 minutes and measuring the brittle fracture rate of the chemically treated specimen by dropping a 1 kg sphere onto the specimens at a height of 50 cm 20 times; and a difference in yellow index of about 0.7 measured prior to and after UV irradiation for 3 hours using a colorimeter (Minolta 3600D by CIE Lab.) in accordance with ASTM G53.

7. The glass fiber reinforced polycarbonate resin composition of claim 1, further comprising an additive selected from the group consisting of UV absorbing agents, inorganic fillers, flame retardants, lubricants, plasticizers, thermal stabilizers, antioxidants, light stabilizers, pigments, dyes, and mixtures thereof.

8. The glass fiber reinforced polycarbonate composition of claim 1, wherein said composition excludes a core-shell graft copolymer.

9. The glass fiber reinforced polycarbonate resin composition of claim 1, wherein the modified polyolefin is a branched graft copolymer containing polyolefin as a main chain.

10. A molded article produced from the resin composition as defined in claim 1.

11. The molded article of claim 10, wherein said composition excludes a core-shell graft copolymer.

12. A molded article produced from the resin composition as defined in claim 7.

13. The molded article of claim 12, wherein said composition excludes a core-shell graft copolymer.

14. A method for preparing a glass fiber reinforced polycarbonate resin composition comprising:
   providing about 40 to about 95 parts by weight of a polycarbonate resin and about 0.1 to 10 parts by weight of a branched graft copolymer having a polyolefin main chain and a side chain comprising at least one functional group selected from the group consisting of methacrylate groups, acrylate groups, modified ester groups, C6-C12 arylate groups, acrylonitrile groups, and combinations thereof into a main feeder of an extruder, wherein said side chain is present in an amount of about 24 to about 50% by weight based on the total weight of the branched graft copolymer;
   adding about 5 to about 60 parts by weight of a glass fiber through a side feeder of the extruder to form a glass fiber reinforced polycarbonate resin composition; and
   operating the extruder at a temperature of about 230 to about 350° C.

15. The method of claim 14, wherein said branched graft copolymer having a polyolefin main chain is a polyolefin modified with at least one functional group selected from the group consisting of methacrylate groups, acrylate groups, modified ester groups, C6-C12 arylate groups, acrylonitrile groups, and combinations thereof.

16. The method of claim 14, wherein said resin composition has a melt flow rate (MFR) of about 12 to about 25 g/10 minutes (250° C., 10 kg) measured in accordance with ASTM-D1238; a notch Izod impact strength of about 19 to about 50 kgf·cm/cm measured for a ⅛" specimen in accordance with ASTM-D256; a brittle fracture rate of about 0 to about 10% as determined by subjecting a specimen of the composition to a chemical treatment comprising submerging the specimen into a paint thinner for 2 minutes and thereafter drying the specimen at 80° C. for 30 minutes and measuring the brittle fracture rate of the chemically treated specimen by dropping a 1 kg sphere onto the specimens at a height of 50 cm 20 times; and a difference in yellow index of about 0.7 measured prior to and after UV irradiation for 3 hours using a colorimeter (Minolta 3600D by CIE Lab.) in accordance with ASTM G53.

17. The method of claim 14, wherein said composition excludes a core-shell graft copolymer.

18. A method for improving flowability, impact resistance, chemical resistance and light resistance of a glass fiber reinforced polycarbonate resin composition comprising:

employing about 0.1 to about 10 parts by weight of a polyolefin modified with at least one functional group selected from the group consisting of methacrylate groups, acrylate groups, modified ester groups, C6-C12 arylate groups, acrylonitrile groups, and combinations thereof per 100 parts by weight of a glass fiber reinforced polycarbonate resin, wherein the functional group is present in an amount of about 24 to about 50% by weight based on the total weight of the modified polyolefin.

19. The method of claim 18, wherein said composition excludes a core-shell graft copolymer.

20. The method of claim 19, wherein said composition excludes a acrylonitrile-butadiene-styrene graft copolymer resin.

* * * * *